May 5, 1959
F. T. COPE ET AL
2,885,197
MUFFLE TYPE FURNACE WITH MOVABLE
SECTIONAL FURNACE SHELL
Filed April 18, 1956
8 Sheets-Sheet 1
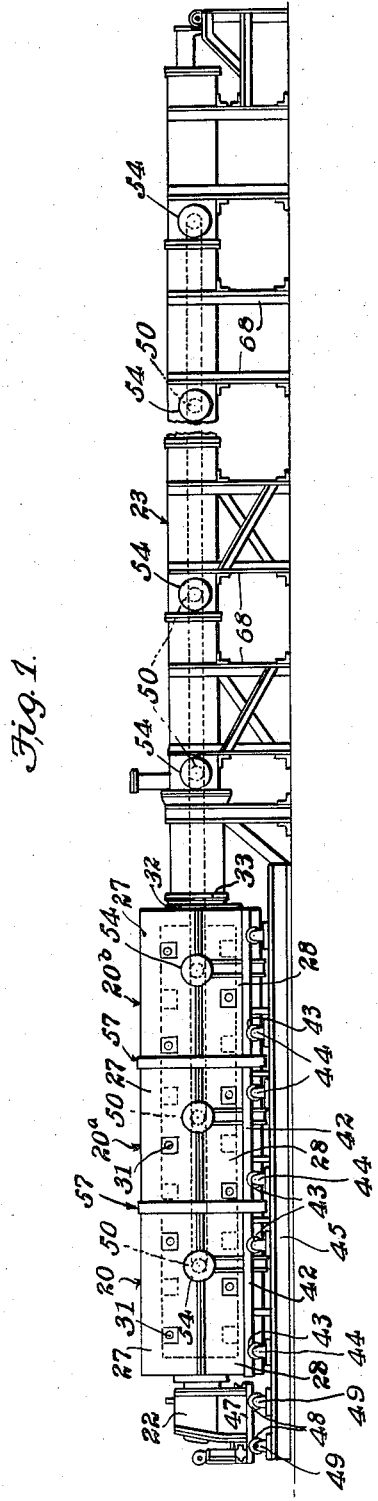
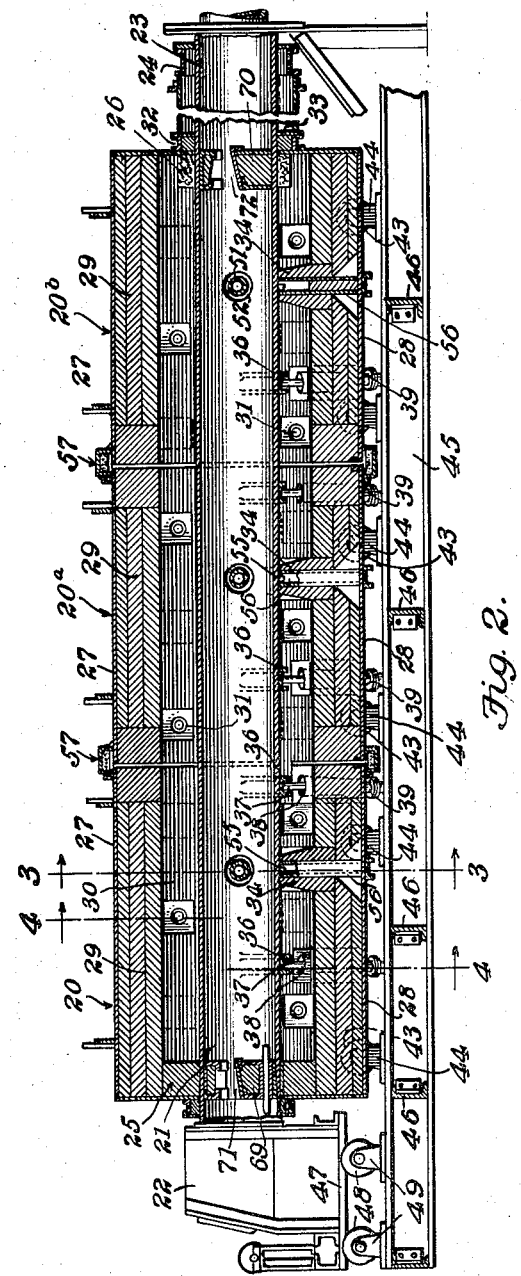
F. Troy Cope
Arthur H. Vaughan
INVENTORS
BY
Freak & Bishop F. Troy Cope and
Arthur H. Vaughan
INVENTORS

BY

Frease & Bishop

F. Troy Cope and
Arthur H. Vaughan
INVENTORS

BY

Frease & Bishop

May 5, 1959
F. T. COPE ET AL
2,885,197
MUFFLE TYPE FURNACE WITH MOVABLE
SECTIONAL FURNACE SHELL
Filed April 18, 1956
8 Sheets-Sheet 5
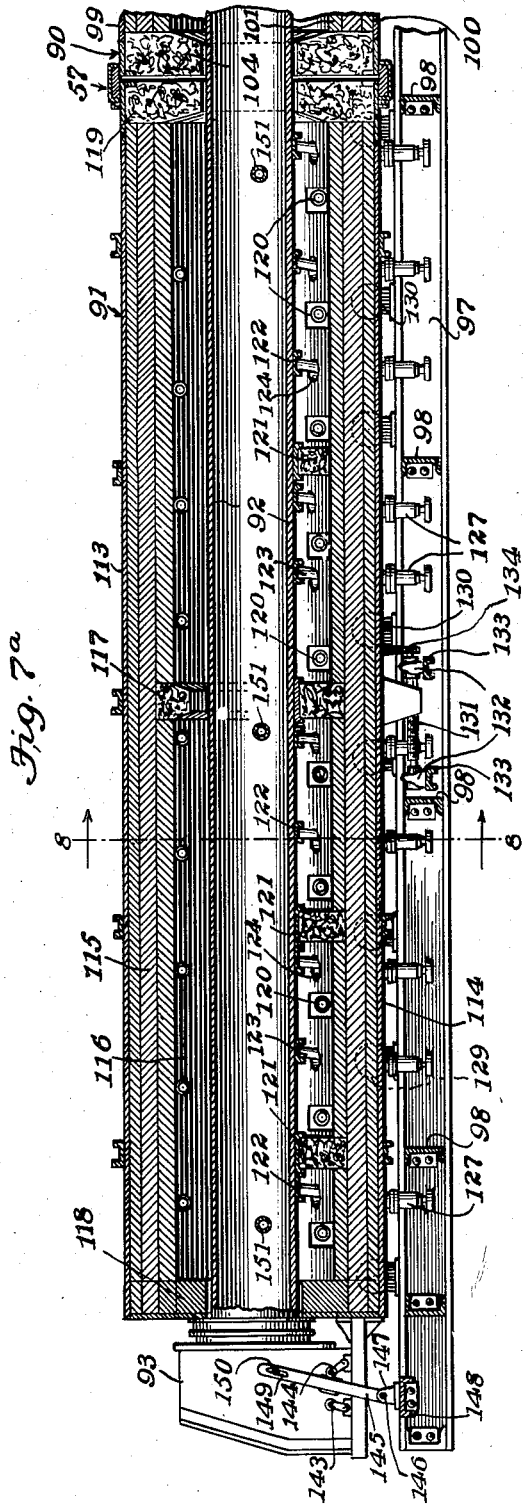
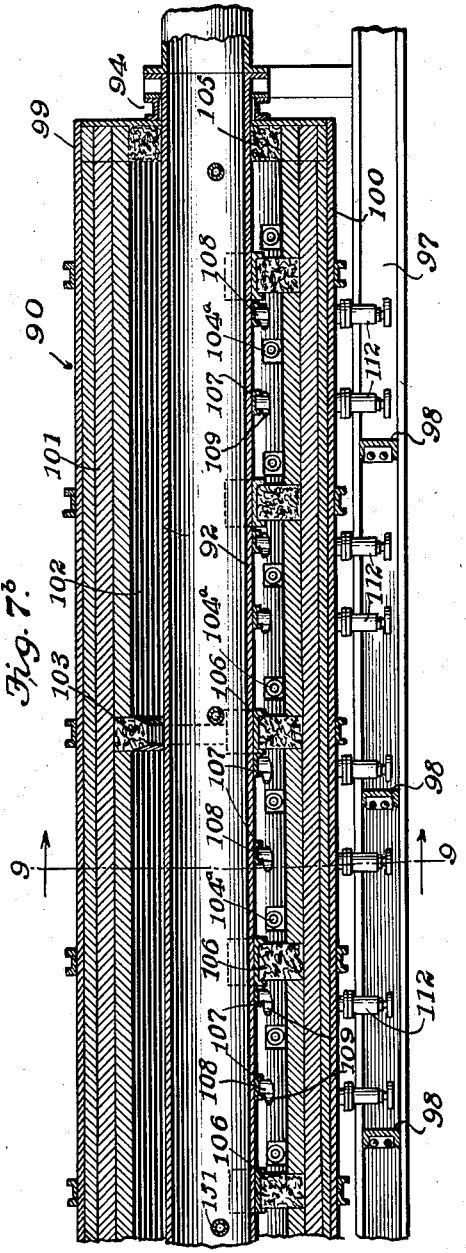
F. Troy Cope
Arthur H. Vaughan
INVENTORS
BY
Frease & Bishop

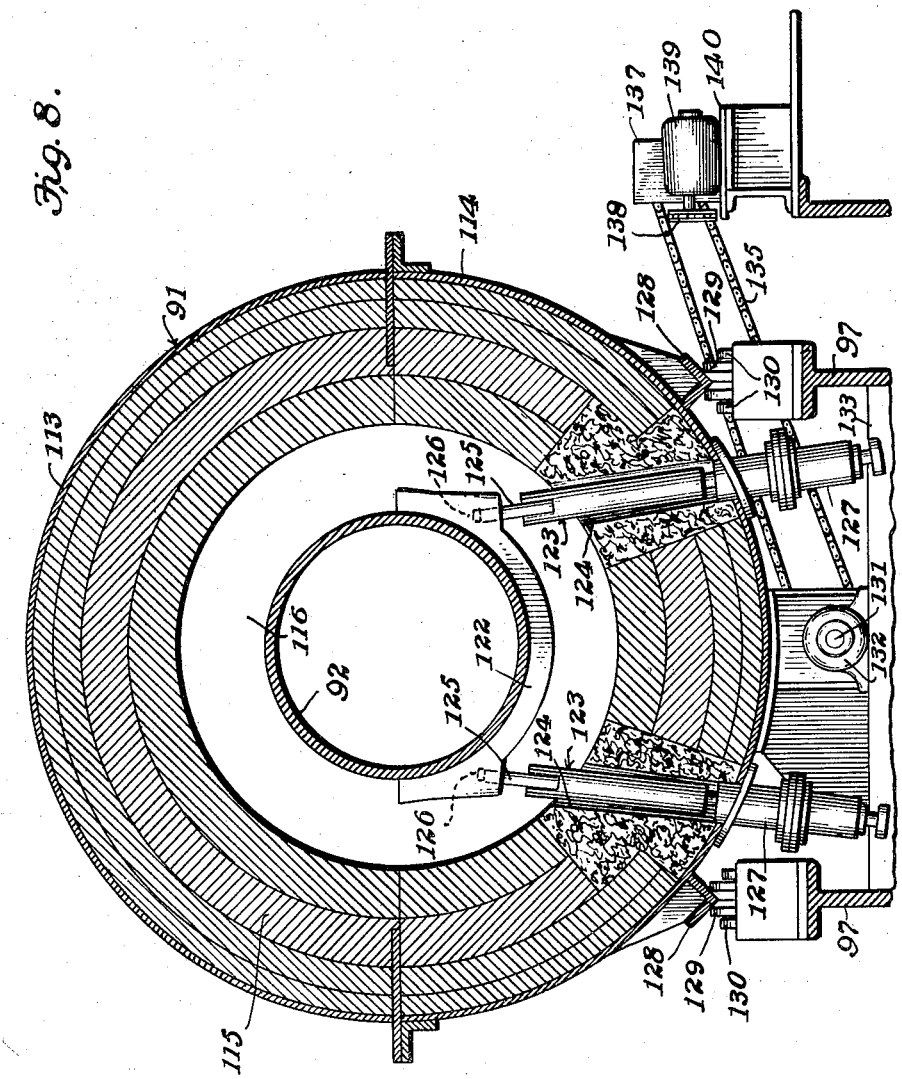

May 5, 1959  F. T. COPE ET AL  2,885,197
MUFFLE TYPE FURNACE WITH MOVABLE
SECTIONAL FURNACE SHELL
Filed April 18, 1956  8 Sheets-Sheet 7

F. Troy Cope 2nd
Arthur H. Vaughan
INVENTORS

BY

Frease & Bishop

F. Troy Cope and
Arthur H. Vaughan
INVENTORS

BY

Frease & Bishop

United States Patent Office 2,885,197
Patented May 5, 1959

2,885,197

MUFFLE TYPE FURNACE WITH MOVABLE SECTIONAL FURNACE SHELL

F. Troy Cope and Arthur H. Vaughan, Salem, Ohio, assignors to The Electric Furnace Company, Salem, Ohio, a corporation of Ohio Application April 18, 1956, Serial No. 578,924

24 Claims. (Cl. 263—41)

This invention relates to muffle type furnaces such as are used for continuous bright annealing of stainless steel strip and the like, and the present application concerns certain improvements upon the construction disclosed in the copending application of Arthur H. Vaughan, Serial No. 510,711, filed May 24, 1955, now Patent No. 2,825,547.

Furnaces of this general type usually include an elongated, refractory lined furnace chamber, a heat resisting alloy muffle extending longitudinally through the furnace chamber, a water jacketed cooling chamber communicating with the muffle and entrance and exit vestibules provided with suitable air excluding means such as curtains.

The muffle, cooling chamber and vestibules are connected by gas-tight joints, and the interior of the muffle and cooling chamber is filled, when in operation, with a protective atmosphere, such as hydrogen or dissociated ammonia, maintained at a point of minus 40° C., or lower, by careful exclusion of oxygen.

In said copending application above referred to, support means for the muffle includes support struts tiltably engaging the muffle adjacent each marginal edge thereof, to prevent flattening of the muffle, by the action of gravity, under high temperatures, and permitting the muffle to expand and contract longitudinally under temperature changes.

Such a construction performs satisfactorily upon muffle type furnaces in which the muffle is of limited length. However, in cases where the muffle materially exceeds twenty-five feet in length, it is found desirable to provide other means for compensating for the extreme elongation of the muffle under the high temperatures to which it is subjected.

For example, an alloy commonly used for the construction of such muffles, will expand one-fourth inch in one foot, or twelve and one-half inches in fifty feet, under normal furnace temperatures, resulting in a considerable differential in the length of the heated muffle relative to the length of the furnace shell.

Furthermore, it is sometimes desirable to provide driven supporting rolls for the strip material being moved through the furnace for annealing or other treatment. Such rolls may be installed by attaching tubular members to opposite sides of the muffle and locating them through the furnace shell, with bearing assemblies at their terminal ends. The rolls are journalled in these bearings and located through the tubular members and through the muffle, thus preventing longitudinal expansion or contraction of the muffle relative to the furnace shell.

Applicants have discovered that this problem may be solved by constructing the furnace shell in sections, movable longitudinally relative to each other, and caused to move longitudinally as the muffle expands or contracts. The invention further contemplates the provision of sealing rings at the joints between the sections of the furnace shell.

It is therefore an object of the invention to provide a muffle type furnace including an elongated furnace shell formed of a plurality of sections movable longitudinally relative to each other, a muffle located longitudinally through the furnace shell, and means for moving said furnace shell sections longitudinally as the muffle expands or contracts.

Another object is to provide a muffle type furnace of the character referred to, having means bodily connecting the muffle to the movable furnace shell sections, whereby as the muffle longitudinally expands or contracts it will move the furnace shell sections longitudinally therewith.

A further object is to provide such a muffle type furnace having power operated means for longitudinally moving the furnace shell sections, and means operated by the longitudinal expansion and contraction of the muffle for controlling said power operated means.

A still further object is to provide a muffle type furnace of this character including a motor operated screw means for longitudinally moving the furnace shell sections, and limit switch means operated by longitudinal expansion and contraction of the muffle for controlling operation of the motor.

Another object of the invention is to provide a muffle type furnace of the character referred to, including movable struts tiltably engaging the muffle adjacent each marginal edge thereof, and means for moving the furnace shell sections longitudinally as the muffle expands or contracts.

A further object is to provide such a muffle type furnace in which radially disposed lugs are formed on the exterior of the muffle and engaged in sockets on the furnace shell sections for longitudinally moving said furnace shell sections in unison with the muffle, as the muffle expands or contracts.

It is also an object of the invention to provide a novel construction of sealing ring at the joints between furnace shell sections, in order to permit relative longitudinal movement of the furnace shell sections while maintaining gas-tight joints therebetween.

And finally, it is an object of the invention to generally improve the construction and operation of muffle type furnaces.

The above and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicants have contemplated applying the principle, being set forth in detail in the following description and illustrated in the accompanying drawings.

In general terms, the invention may be described as comprising a muffle type furnace including an elongated refractory lined furnace chamber, formed of a plurality of longitudinally movable furnace shell sections having sealing rings at the joints between sections.

A heat-resisting alloy muffle extends longitudinally through the furnace shell sections, the muffle being anchored at one point and be otherwise free to expand and contract away from and toward said anchor point. Means is provided for causing the furnace shell sections to move longitudinally with the muffle as it expands or contracts.

One embodiment of the invention provides means for bodily connecting the muffle to the several movable furnace shell sections, as by lugs upon the muffle engaged in sockets on the furnace shell sections, whereby as the muffle is expanded or contracted longitudinally by temperature changes within the furnace, it will move the furnace shell sections longitudinally therewith.

The muffle is supported for longitudinal expansion and contraction, and the support means for the muffle may include movable struts tiltably engaging the muffle adjacent each marginal edges thereof, so as to prevent flattening of the muffle caused by the action of gravity, under high temperatures to which the muffle is subjected during normal operation of the furnace.

Each section of the furnace shell is mounted upon rollers, whereby the several sections may be easily moved longitudinally, relative to each other, as the muffle is expanded or contracted.

In another embodiment of the invention, power-operated means is provided for independently moving each furnace shell section longitudinally, the power-operated means being controlled by means such as limit switches, operated by the elongation or shortening of the muffle under temperature changes.

This power-operated means is shown as a screw journalled in bearings on the base of the furnace and operatively engaging a nut upon each movable section of the furnace shell. A motor is operatively connected to each screw, and the circuit to the motor is controlled by limit switches operated by means upon the muffle.

Having thus briefly described the invention, reference is now made to the accompanying drawings showing the best modes in which applicants have contemplated embodying the invention, in which;

Fig. 1 is a side elevation of a muffle type furnace embodying the invention, showing the furnace shell formed of a plurality of longitudinally movable sections connected to the muffle for movement thereby as the muffle expands and contracts;

Fig. 2 is a longitudinal sectional view through the muffle type furnace shown in Fig. 1, showing the lug and socket connections between the muffle and the furnace shell sections;

Fig. 7a is a longitudinal sectional view through the movable section of the furnace shell of a muffle type furnace as shown in Fig. 6;

Fig. 7b is a similar view of the stationary furnace shell;

Fig. 8 is an enlarged transverse sectional view through the movable furnace shell, taken as on the line 8—8, Fig. 7a;

Figure 3:
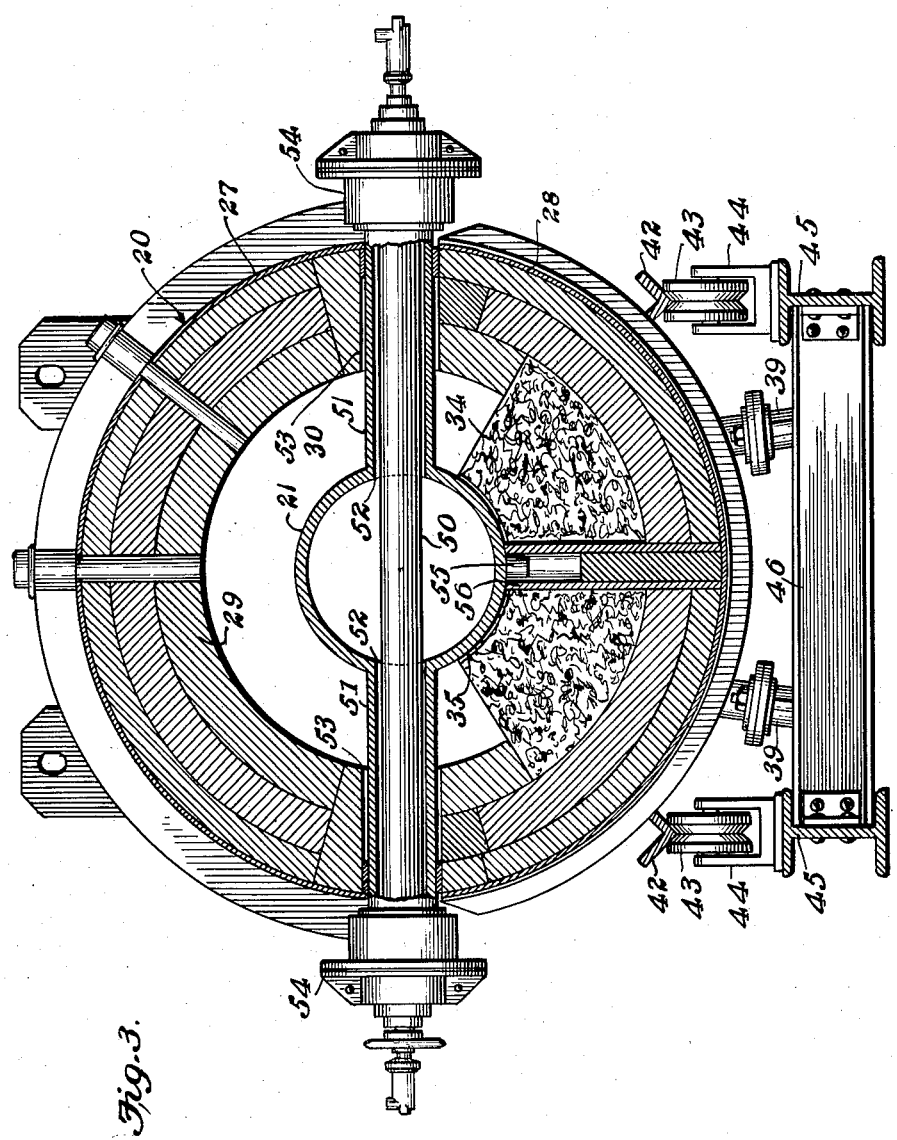
Fig. 3 is an enlarged, transverse sectional view through the furnace shown in Figs. 1 and 2, taken as on the line 3—3, Fig. 2.

Referring now more particularly to the embodiments of the invention illustrated, in which similar numerals refer to similar parts throughout, the form of the invention shown in Figs. 1 to 4 inclusive will first be described. The furnace illustrated in these figures is a muffle type furnace, adapted for use as a continuous annealing furnace for annealing stainless steel strips and the like.

In this embodiment of the invention, the furnace proper is formed of a plurality of similar, independently movable furnace sections, indicated generally at 20, 20a and 20b. A tubular muffle 21, formed of suitable heat resisting alloy, is located entirely through the movable furnace shell sections, communicating at its forward end with the charging vestibule 22, and at its rear end with the cooling chamber 23, which may be water-jacketed in usual and conventional manner, as indicated at 24.

The several furnace shell sections are substantially identical in construction, with the exception that the first section 20 is provided at its entrance end with the end wall indicated generally at 25, and the last section 20b is provided at its discarge end with the end wall indicated generally at 26.

Each section of the furnace shell may include the steel shell upper and lower halves 27 and 28 respectively, a refractory lining 29 enclosing the elongated cylindrical heating chamber 30. The furnace may be heated in any conventional manner by fuel or electric heating elements. Where it is desired to heat by fuel, burner openings 31 may be located tangentially through the side walls of the furnace sections.

Anchor members 32 are integrally attached to the steel shells 27 and 28 of the furnace shell section 20b, for the purpose of attaching the flange 33 of the muffle at the working exit end of the furnace. It should be understood that in this embodiment of the invention, as well as in the other embodiments thereof to be later described, the muffle may, if desired, be anchored at some point other than at the exit end of the furnace.

For the purpose of supporting the muffle within the furnace chamber, as in usual and well known practice, refractory piers 34 are located in the bottom of the furnace chamber 30, and are mounted upon the refractory lining 29 in the lower sides of the furnace shell sections 20, 20a and 20b. The upper surfaces of these piers are curved, preferably to a radius slightly greater than that of the muffle, as indicated at 35 in Fig. 3. These piers, together with the end walls 25 and 26, contribute to the support of the muffle, and also resist any tendency to lateral curvature of the muffle, which might result from temperature differences.

Figure 4:
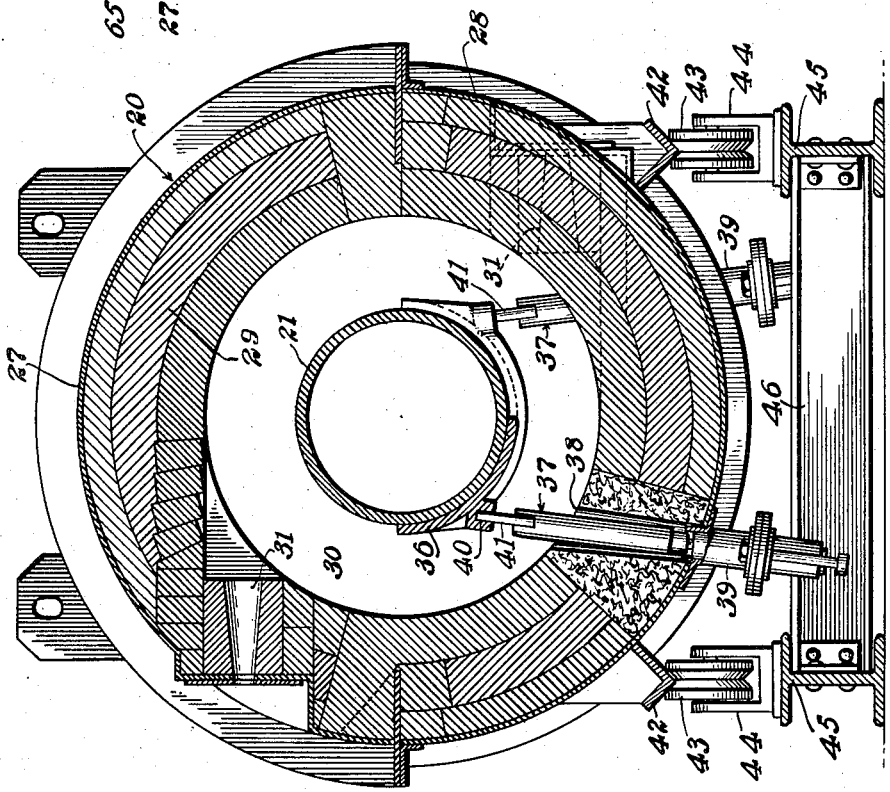
Fig. 4 is an enlarged, transverse sectional view through the furnace, taken as on the line 4—4, Fig. 2.

If desired, the muffle load may be further supported by movable struts tiltably engaging the marginal edges of the muffle, as disclosed in copending application Serial No. 510,711, now Patent No. 2,825,547, above referred to. For this purpose, a series of strut assemblies are provided, as best shown in Figs. 2 and 4. Each of these strut assemblies comprises an arcuate band 36, curved to conform to the lower half of the muffle 21, and a pair of struts indicated generally at 37, titltably engaged with said band.

The bands 36 may be so attached to the muffle 21 as to permit them to "wrap" into conformity with the muffle. This may be accomplished by welding or otherwise attaching each band to the muffle near the bottom center point, leaving the ends of the bands free, thus permitting the desired "wrapping" action, while preventing displacement of the bands lengthwise or circumferentially of the muffle.

Slots 38 are formed in the refractory lining 29 of the furnace shell sections to receive the struts 37, these slots being of such size as to permit the necessary rocking motion of the struts. These struts are shown in Fig. 4 tilted inward toward the muffle at a slight angle to the vertical. As illustrated and described in detail, in said copending application Serial No. 510,711, the desirable angle of the struts will generally be between vertical and about 30 degrees inward tilt, and this inward tilt is found in practice to exert some sidewise flattening action to counteract the vertical flattening tendency produced by the piers.

The lower end of each strut 37 is mounted in a spring socket 39, attached to the lower half shell 28, and extending downwardly and below the shell. A spring seat is adjustably mounted in the lower portion of the socket 39, the detail construction of which is fully disclosed in said copending application, and since the details thereof form no part of the present invention, it is not thought necessary or desirable to further disclose the same herein.

Recesses 40 are formed in the bands 36, near opposite ends thereof, and the upper portion 41 of each strut is of rocker shape, as disclosed in said copending application, so as to permit tilting of the struts caused by longitudinal expansion or contraction of the muffle.

The furnace shell sections 20, 20a and 20b are independently movable longitudinally relative to the muffle 21. For this purpose, longitudinally disposed rails 42, preferably V-shape as shown, are attached to opposite sides of the lower steel shell 25 of each furnace shell section. These rails 42 ride upon the V-groove rollers 43, journalled in bearing brackets 44 mounted upon the longitudinally disposed I-beams 45 of the base. Transversely disposed channel members 46 are located at spaced points throughout the length of the base, and are connected at opposite ends to the longitudinal I-beams 45, holding said I-beams in spaced position.

Similar rails 47 are attached to the lower portion of the entrance vestibule 22, at opposite sides thereof, and ride upon the rollers 48, journalled in bearing brackets 49 mounted upon the I-beam 45 of the base. Thus, each of the furnace shell sections 20, 20a and 20b may move freely upon the rollers 43, independently of each other.

As the muffle 21 expands and contracts longitudinally, due to temperature changes, the elongation and contraction thereof will be from and toward the anchor point 32, and the entrance vestibule 22, being attached to the free end of the muffle 21, will ride upon the rollers 49.

For the purpose of providing transversely disposed rolls 50 within the muffle 21, for supporting strip material passed through the furnace for annealing and the like, tubular members 51 may be welded or otherwise attached to diametrically opposite points on the muffle and disposed horizontally through the furnace shell sections, as best shown in Fig. 3.

Apertures 52 are formed in the muffle 21 at the points of connections thereto of the tubular members 51. Openings 53 are provided in opposite sides of the refractory lining and steel shells of the furnace shell sections 20, 20a and 20b. The tubular members 51 are located through the openings 53 and terminate in bearing assemblies 54 on opposite sides of the furnace shells. The material supporting rolls 50 are journalled in said bearing assemblies 54, and extend through the tubular members 51 and through the muffle 21, as shown in Fig. 3.

In order to cause the furnace shell sections 20, 20a and 20b to move longitudinally as the muffle 21 is elongated or contracted, lugs or bosses 55 are formed on the undersides of the muffle and located in sockets in the furnace shell sections. These sockets are shown as comprising vertical tubular members 56, located in the piers 34, the lugs or bosses 55 of the muffle being received in the open upper ends of said tubular members, as shown in Figs. 2 and 3.

With this construction, it will be seen that, as the muffle 21 expands or contracts, the furnace shell sections 20, 20a and 20b, being bodily attached to the muffle through the lugs 55 and sockets 56, will be caused to move longitudinally with the muffle as it expands or contracts.

The several furnace shell sections will thus be freely movable longitudinally, independently of each other, upon the rollers 43, by the expansion and contraction of the muffle, and, as the muffle is thus expanded or contracted, the entrance vestibule 22 will be free to move upon the rollers 48.

Figure 13:
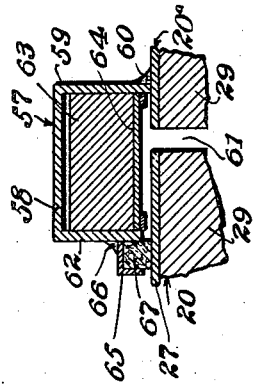

For the purpose of providing a seal between the adjacent ends of the relatively movable furnace shell sections 20, 20a and 20b, sealing rings of the type shown in detail in Fig. 13, are provided. Each of these sealing rings is indicated generally at 57, and includes a channel ring 58, one annular flange 59 of which is welded to the steel shell of one furnace section, adjacent one end of said section, as indicated at 60.

The channel ring 58 overlaps the space 61 between adjacent ends of the two furnace sections, the other annular flange 62 of said channel ring terminating inwardly at a point slightly spaced from the steel shell of the next adjacent furnace section. A refractory lining 63 is provided within the channel ring 58 and is retained therein in spaced relation to the steel shells of the two adjacent furnace sections, as by the metal ring 64.

An angle ring 65 is welded or otherwise attached to the annular flange 62 of the channel ring 58, as indicated at 66, and terminates inwardly at a point spaced from the outer shell of the adjacent furnace section. A packing ring 67 is located within the channel ring 65, and slidably engages the outer steel shell of the corresponding furnace section.

With the sealing ring assembly shown in Fig. 13, it will be evident that as the two adjacent furnace sections, indicated at 20 and 20a, move longitudinally toward or from each other, the channel ring 58, being attached to the furnace section 20a, will move with the furnace section 20a relative to the section 20. The packing ring 67, carried at the free end of the channel ring 58, will thus slide longitudinally upon the outer steel shell of the furnace section 20, thus maintaining an adequate seal between the adjacent ends of the furnace sections 20 and 20a in any relative positions of said furnace sections during normal operation of the furnace. It should be understood that the sealing ring between the adjacent ends of the furnace sections 20a and 20b is exactly the same as shown in Fig. 13.

The cooling chamber 23 may be of any desired or necessary length, and is rigidly supported above the floor upon the frame members 68. Supporting rolls 50, journalled in bearing assemblies 54, may be provided throughout the length of the cooling chamber for supporting the strip material passing through the furnace.

End walls 69 and 70 are located within the muffle at opposite ends thereof, substantially adjacent to the end walls 25 and 26 respectively of the furnace sections, and restricted openings 71 and 72 are provided in the end walls 69 and 70 respectively, for permitting the passage of strip material therethrough.

In the operation of the form of muffle type furnace shown in Figs. 1 to 4, the interior of the muffle and the cooling chamber are filled with a protective atmosphere, preferably hydrogen or dissociated ammonia, which may be maintained at a point of minus 40° C. or lower, by careful exclusion of oxygen.

The burners or heating elements of the furnace are operated to produce the desired temperature within the furnace sections 20, 20a and 20b, and the material to be annealed, such as stainless steel strip material or the like, is charged into the charging vestibule 22, and through the opening 71 at the entrance end of the muffle, and is passed longitudinally through the muffle, being supported therein upon the supporting rollers 50, the material passing out of the muffle through the cooling chamber.

During this operation, as the muffle 21 becomes heated to high temperature, it will expand, elongating in the direction of the charging end thereof causing the charging vestibule 22 to move longitudinally upon the rollers 48.

Since each of the furnace sections 20, 20a and 20b is bodily attached to the muffle 21, through the lugs 55 and sockets 56, this elongation of the muffle will cause the several furnace sections to be independently moved to the left, as viewed in Figs. 1 and 2, each furnace section moving independently of the other furnace section and in proportion to the amount of elongation of the muffle 21 at the point where it is connected to each furnace section. The furnace sections 20, 20a and 20b will thus be moved longitudinally upon the rollers 43, in unison with the movement of the muffle.

The sealing rings 57, at the joints between adjacent furnace sections, will move longitudinally with each furnace section, relative to the adjacent section, the packing rings 67 carried by said sealing rings sliding upon the outer steel shells of said adjacent furnace sections, and maintaining sealed joints between the sections.

In cases where the movable struts 37 are provided for supporting the muffle 21, these struts will be tilted by the expansion or contraction of the muffle, supporting the muffle adjacent opposite marginal edges thereof and tending to prevent flattening of the muffle due to gravity under high temperatures.

In the same manner, as the muffle contracts upon cooling, the charging vestibule 22 will be moved to the right upon the rollers 48, and the several furnace sections 20, 20a and 20b, will be moved to the right as viewed in the drawings, in unison with the contracting movement of the muffle, the furnace sections independently moving freely upon the rollers 43. The sealing rings 57 will function in the same manner as above described, maintaining a seal between adjacent ends of the sections as they are moved back to normal position by contraction of the muffle.

Figure 5:
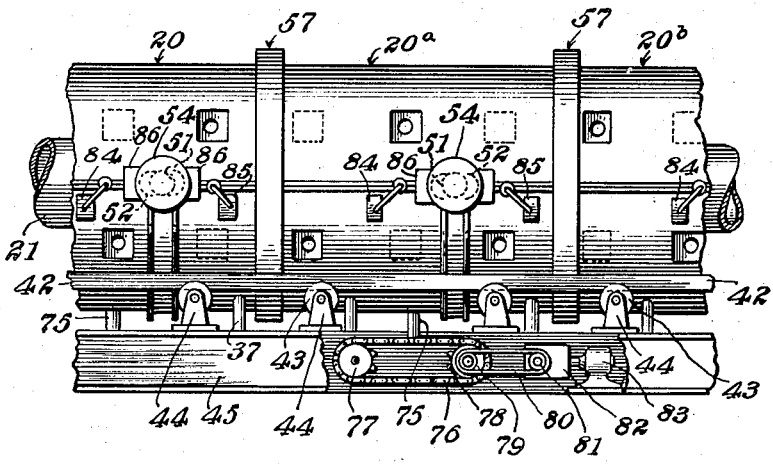
Fig. 5 is a fragmentary side elevation of a modified form of muffle type furnace embodying the invention, in which each movable section of the furnace shell is adapted to be moved longitudinally by power-operated means controlled by limit switches operated by the movement of the muffle.
Figure 6:
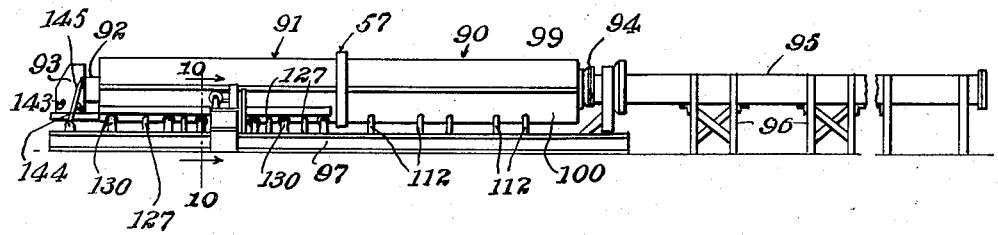
Fig. 6 is a diagrammatic side elevation of another modification of the invention, in which the furnace shell comprises a stationary section and a movable section adapted to be moved longitudinally by power-operated means controlled by a limit switch operated by the longitudinal movement of the muffle.

In Fig. 5 is shown a modification of the furnace above described. In this embodiment of the invention, the furnace sections 20, 20a and 20b may be the same as illustrated and described with reference to Figs. 1 to 4, and the sealing rings 57 at the joints between adjacent furnace sections may be the same as shown in detail in Fig. 13 and above described.

The furnace sections may each be provided with rails 42, riding upon rollers 43, journalled in bearing brackets 44, mounted upon the I-beams 45 of the base in the manner above described. The muffle 21 may be the same as shown in Figs. 1 to 4 and above described, and may be provided with a charging vestibule and cooling chamber (not shown) of the same type as above illustrated and described.

However, in this embodiment of the invention, the muffle is not bodily connected to the several furnace sections as shown in Figs. 1 to 4, but each furnace section is adapted to be moved longitudinally in unison with the muffle by power-operated means, controlled by limit switches operated by the expansion and contraction of the muffle.

For this purpose, each furnace section may be connected, by means as indicated at 75, to an endless, longitudinally disposed chain 76, located around sprockets 77 and 78 journalled within the base 45 of the furnace. The shaft 79 of the sprocket 78 is connected, by belt or chain 80, to the pulley or sprocket 81 upon the gear reducer 82 which is operatively connected to the motor 83.

This motor should be a reversing motor, and the circuit thereto is adapted to be controlled by a pair of limit switches 84 and 85 mounted in longitudinally spaced relation upon each furnace section.

Pairs of oppositely disposed lugs 86 are mounted upon the bearing assembly 54 of each roll tube 51. These lugs are positioned to contact the limit switches 84 and 85. The apertures 52 in the furnace sections, through which the roll tubes 51 are located, are elongated as shown in dotted lines in Fig. 5, so as to permit movement of said roll tubes, longitudinally of the furnace sections, as the muffle expands and contracts.

Thus, as the muffle 21 expands or contracts, the lugs 86 thereon will contact the corresponding limit switches 84 or 85, closing the circuit to the motor and causing it to move the operating chain 76 in a direction to independently move the furnace section in accordance with the expansion or contraction of the muffle within that furnace section. The furnace sections will each ride independently upon the rollers 43 as they are moved longitudinally.

In Figs. 6 to 12 inclusive is shown another embodiment of the invention, in which the furnace comprises a stationary section and a movable section which is movable longitudinally relative to the stationary furnace section. In this embodiment of the invention, the movable furnace section is adapted to be moved in unison with the muffle, as it expands and contracts, by power-operated screw means controlled by limit switches operated by expansion and contraction of the muffle.

The stationary furnace section is indicated generally at 90 and the movable furnace section at 91. A tubular muffle 92 extends longitudinally through both furnace sections, and is connected at its forward end to the entrance vestibule 93. The rear end of the muffle is anchored to the exit end of the stationary furnace section 90, as indicated at 94. A cooling chamber 95 communicates with the discharge end of the muffle 92, and may be supported upon frame members 96. A sealing ring 57, similar to the sealing ring illustrated and described above in detail, is provided between the stationary and movable furnace sections for maintaining an airtight joint therebetween.

The stationary furnace section 90, movable furnace section 91 and entrance vestibule 93 are all mounted upon a base comprising the longitudinal I-beams 97 connected at spaced intervals by the transversely disposed channel members 98. The stationary furnace section is fixed upon the base, and the movable furnace section and entrance vestibule are longitudinally movable thereon as will be later described in detail.

Figure 9:
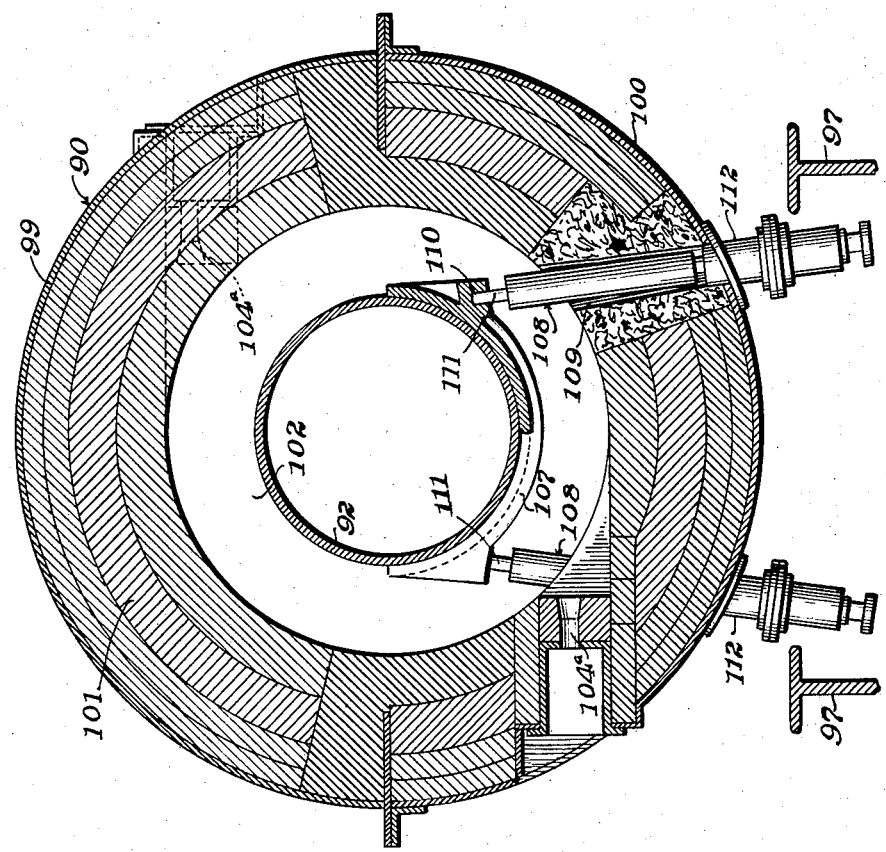
Fig. 9 is an enlarged transverse sectional view through the stationary furnace shell, taken as on the line 9—9, Fig. 7b.

As shown in Figs. 7b and 9, the stationary furnace section 90 includes the steel shell upper and lower halves 99 and 100 respectively, a refractory lining 101 enclosing a heating chamber 102, which may be divided into zones by the arch wall 103. Refractory end walls 104 and 105 are located at the entrance and exit ends respectively of the stationary furnace section 90, and provided with openings through which the muffle 92 is located.

Any conventional manner of heating the furnace chamber 102, by fuel or electric heating elements, may be provided. Tangential openings 104a may be located through the steel shell and refractory lining of the furnace section 90, for locating fuel burners therethrough.

A spaced plurality of refractory piers 106 are located in the bottom of the furnace chamber 102, of the stationary furnace section 90, and the upper surfaces thereof are curved, preferably to a radius slightly greater than that of the muffle, in the manner illustrated and described above in reference to the embodiment shown in Figs. 1 to 4. These piers 106, together with the end walls 104 and 105, contribute to the support of the muffle 92, and also resist any tendency to lateral curvature of the muffle, which might result from temperature differences.

As a further support for the muffle, and preferably for supporting the major portion of the muffle load, a series of strut assemblies may be provided in the stationary furnace section 90, as shown in Figs. 7b and 9. These strut assemblies may be the same as shown and described in reference to the embodiment of Figs. 1 to 4 inclusive, and as disclosed in detail in said copending application.

For this purpose, each strut assembly may comprise an arcuate band 107, curved to conform to the lower half of the muffle 92, and a pair of struts indicated generally at 108, tiltably engaged with said band. The bands 107 may be welded or otherwise attached to the muffle 92 near the bottom center point only, so as to permit the bands to "wrap" into conformity with the muffle while preventing displacement of the bands lengthwise or circumferentially of the muffle.

The struts 108 are located through the slots 109 in the refractory lining 101, so as to permit the necessary rocking motion of the struts. In the manner above described in connection with the form of the invention shown in Figs. 1 to 4 inclusive, recesses 110 are formed in the bands 107, near opposite ends thereof, and the upper portion 111 of each strut 108 is of rocker shape, so as to permit tilting of the struts caused by longitudinal expansion or contraction of the muffle. And also, as above described, the lower end of each strut 108 is mounted within a spring socket 112, attached to the lower shell 100 and extending downwardly below the shell.

The movable furnace section 91, as shown in Figs. 7a and 8, is of generally the same construction as the stationary furnace section 90, above described. This movable furnace section includes the steel shell upper and lower halves 113 and 114 respectively, a refractory lining 115 enclosing the heating chamber 116, which may be divided into zones by the arch wall 117.

Refractory end walls 118 and 119 are located at the entrance and exit ends respectively of the movable furnace section 91, and provided with openings through which the muffle 92 is located.

The furnace chamber 116 of the movable furnace section may be heated by any conventional means, either by fuel or electric elements. Tangential openings 120 may be located through the steel shell and refractory lining of the furnace section 91, for locating fuel burners therethrough.

A spaced plurality of refractory piers 121 are located in the bottom of the furnace chamber 116 of the movable furnace section, and the upper surfaces thereof are curved, preferably to a radius slightly greater than that of the muffle in the manner above described.

These piers 121, together with the end walls 118 and 119, contribute to the support of the muffle 92 within the furnace section 91, and also resist any tendency to lateral curvature of the muffle due to temperature changes.

If desired, the muffle may be further supported by a series of strut assemblies within the movable furnace section 91. These strut assemblies may be the same as shown and described above in reference to the embodiment of Figs. 1 to 4, and as shown and described in reference to the stationary furnace section of the present embodiment, and as disclosed in detail in the above-mentioned copending application.

Each strut assembly may comprise an arcuate band 122, curved to conform to the lower half of the muffle 92, and a pair of struts, indicated generally at 123, tiltably engaged with said band. As in the other strut assemblies above described, the bands 122 may be attached to the muffle 92 near the bottom center point only, so as to permit wrapping action of the bands into conformity with the muffle, and at the same time prevent displacement of the bands either lengthwise or circumferentially of the muffle.

The struts 123 are located through the slots 124 in the refractory lining 115, so as to permit the necessary rocking motion of the struts, and the upper ends 125 of the struts may be of rocker shape for engaging recesses 126 near opposite ends of the bands. Also, as above described, the lower ends of the struts may be mounted within spring sockets 127, attached to the lower shell 114 of the furnace section 91, and extending downwardly below the same.

For the purpose of permitting longitudinal movement of the movable furnace section 91, rails 128 are attached to each side of the lower shell 114 and are mounted upon rollers 129 journalled in bearing brackets 130 mounted upon the longitudinal I-beams 97 of the base.

Figure 10:
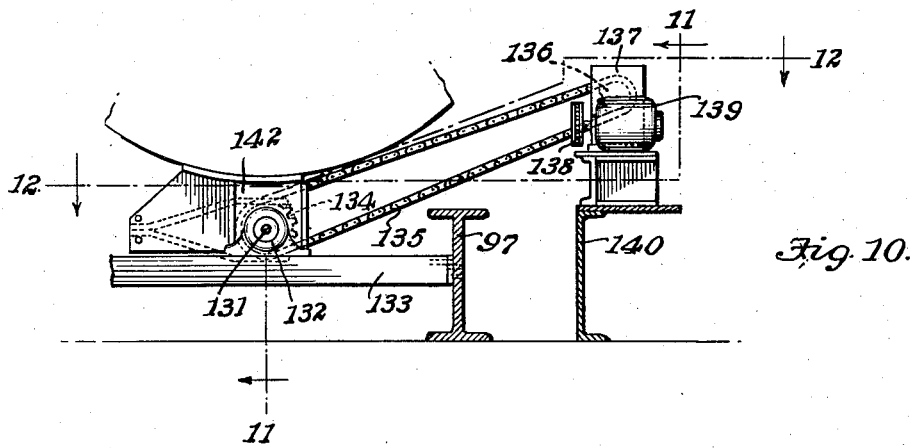
Fig. 10 is an enlarged, fragmentary, transverse sectional view showing the motor operated screw means for longitudinally moving the movable furnace section shell, taken on the line 10—10, Fig. 6.
Figure 11:
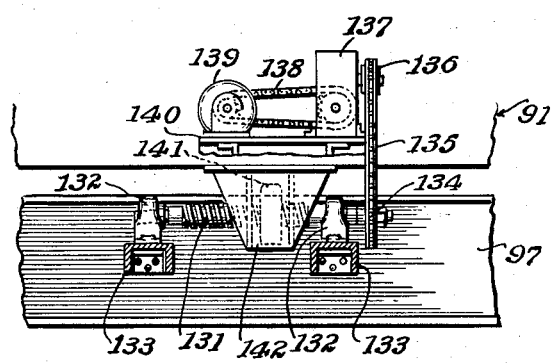
Fig. 11 is a fragmentary, longitudinal sectional elevation of the motor operated screw means, taken on the line 11—11, Fig. 10.
Figure 12:
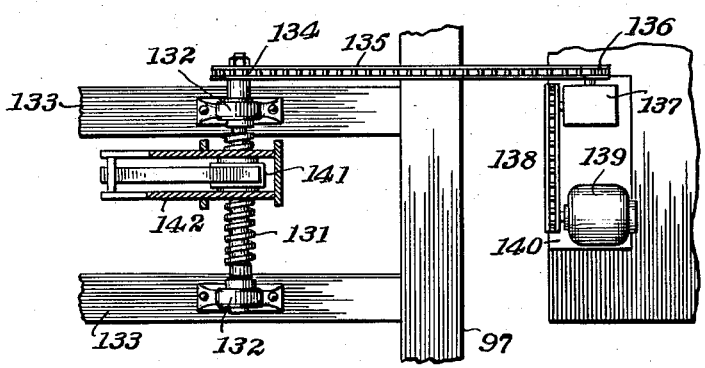
Fig. 12 is a plan sectional view of the motor operated screw means, taken on the line 12—12, Fig. 10; and, Fig. 13 is an enlarged, fragmentary sectional view of the sealing ring provided at the joints between the furnace shell sections.

For the purpose of longitudinally moving the movable furnace section 91, power-operated screw means may be provided, such as best shown in Figs. 10 to 12. This means includes a rotatable screw 131 disposed longitudinally below the movable furnace section 91 and journalled at opposite ends in the bearing brackets 132 supported upon the transversely disposed channel members 133, which are connected at opposite ends to the longitudinal I-beams 97 of the base.

A sprocket wheel 134 is fixed upon one end of the screw shaft 131 and is connected by the chain 135 with the sprocket wheel 136 upon the gear reducer 137. This gear reducer is connected, as by sprockets and chain 138, with a reversing motor 139 which may be mounted upon the supporting bracket 140 located at one side of the base.

A nut 141 is carried by the bracket 142, attached to the lower middle portion of the movable furnace shell section 91. It will thus be obvious that as the screw 131 is rotated in either direction by the reversing motor 139, through the nut 141, the movable furnace section 91 will be moved longitudinally in either direction.

The reversing motor 139, of the power-operated screw means for moving the furnace section 91 longitudinally, is located in a circuit adapted to be controlled by limit switches operated by longitudinal movement of the muffle 92 as the same expands or contracts. These limit switches are indicated at 143 and 144 in Fig. 7a, and are located upon one side of the entrance vestibule 93.

For the purpose of operating these limit switches by longitudinal movement of the muffle 92, a lever 145 is fulcrumed at 146 upon a bracket 147 mounted upon the transversely disposed channel member 148 of the base, the upper end of the lever being slotted as indicated at 149 and engaging a stud or pin 150 upon the side of the entrance vestibule 93.

As the muffle 92 expands, the entrance vestibule 93 connected thereto will be moved forwardly or to the left as viewed in Fig. 7a, the lever 145 being swung forwardly into contact with the limit switch 143 closing the circuit to the reversing motor 139 so that the motor will be operated to rotate the screw 131 in a direction to move the movable furnace section 91 forwardly or to the left, to compensate for the elongation of the muffle.

In the same manner, when the muffle 92 contracts, it will pull the entrance vestibule 93 rearwardly or to the right, as viewed in Fig. 7a, swinging the lever 145 into contact with the limit switch 144, in the position shown in Fig. 7a. This will close the circuit to the reversing motor 139 to rotate the same in proper direction so that the screw 131 will be rotated in a direction to move the movable furnace section 91 rearwardly or to the right, as viewed in Fig. 7a.

If desired, supporting rolls 151 may be located through the muffle, within both the stationary and movable furnace sections, for supporting strip material or the like passing through the furnace. These supporting rolls may be the same as illustrated and above described in detail in connection with the embodiment disclosed in Figs. 1 to 4 of the drawings.

The operation of this embodiment of the invention will be obvious from the drawings and above description. The furnace chambers 102 and 116 of the stationary and movable furnace sections 90 and 91 respectively, may be heated to desired temperature and the desired atmosphere may be provided within the muffle 92. Strip material or the like, to be annealed or otherwise treated, is passed into the charging vestibule 93, through the muffle and then through the cooling chamber in conventional manner.

As the muffle expands, the limit switch 143 will be operated by the lever 145, closing the circuit to the motor 139 which will operate the screw 131 in proper direction to move the movable furnace section 91 forwardly or to the left, as viewed in Fig. 7a, and as the muffle contracts the lever 145 will be moved into contact with the limit switch 144, closing the circuit to the motor 139 to operate the same to rotate the screw 131 in proper direction to move the furnace section 91 rearwardly or to the right as viewed in Fig. 7a, so as to compensate for movement of the muffle in either direction.

With the limit switch actuating lever 145 applied as in Fig. 7a, and as above described, the limit switch contact point of lever 145 may be midway between the fulcrum 146 and the stud 150. Thus a movement of one inch by the end of the muffle, and thus of the stud 150, results in a movement of one-half inch of the limit switch contact point of the lever 145. This will in turn cause the drive means to make a one-half inch movement of the furnace section 91. The final result will be that the struts in the movable section 91 will be subjected to the same maximum angle of tilt as those in the fixed section 90.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

We claim:

1. In a muffle type furnace, a longitudinally bodily movable rigid furnace section comprising rigid walls defining a heating chamber, a tubular muffle extending longitudinally within the heating chamber, means anchoring the muffle against movement at one point, said muffle being adapted to expand and contract longitudinally relative to the anchor point due to temperature changes within the heating chamber, and means operated by expansion and contraction of the muffle for bodily moving said rigid furnace section longitudinally with the muffle as the muffle expands and contracts.

2. In a muffle type furnace, a longitudinally bodily movable rigid furnace section comprising rigid walls defining a heating chamber, a tubular muffle extending longitudinally within the heating chamber, means anchoring the muffle against movement at one point, said muffle being adapted to expand and contract longitudinally relative to the anchor point due to temperature changes within the heating chamber, and means operatively connecting the furnace section to the muffle for bodily moving said rigid furnace section longitudinally with the muffle as the muffle expands and contracts.

3. In a muffle type furnace, a longitudinally movable furnace section comprising walls defining a heating chamber, a tubular muffle extending longitudinally within the heating chamber, means anchoring the muffle against movement at one point, said muffle being adapted to expand and contract longitudinally relative to the anchor point due to temperature changes within the heating chamber, power-operated means for moving the furnace section longitudinally, and means operated by expansion and contraction of the muffle for controlling the operation of said power-operated means so as to move the furnace section longitudinally with the muffle as the muffle expands and contracts.

4. In a muffle type furnace, a longitudinally movable furnace section comprising walls defining a heating chamber, a tubular muffle extending longitudinally within the heating chamber, means anchoring the muffle against movement at one point, said muffle being adapted to expand and contract longitudinally relative to the anchor point due to temperature changes within the heating chamber, means operatively connected to the furnace section for moving it longitudinally in either direction, a reversing motor operatively connected to said means, limit switches for controlling the operation of the motor in either direction, and means upon the muffle for operating said limit switches when the muffle expands and contracts so as to move the furnace section longitudinally with the muffle as the muffle expands and contracts.

5. In a muffle type furnace, a longitudinally movable furnace section comprising walls defining a heating chamber, a tubular muffle extending longitudinally within the heating chamber, means anchoring the muffle against movement at one point, said muffle being adapted to expand and contract longitudinally relative to the anchor point due to temperature changes within the heating chamber, screw means operatively connected to the furnace section for moving it longitudinally in either direction, a reversing motor operatively connected to said screw means, limit switches for controlling the operation of the motor in either direction, and means upon the muffle for operating said limit switches when the muffle expands and contracts so as to move the furnace section longitudinally with the muffle as the muffle expands and contracts.

6. In a muffle type furnace, a longitudinally bodily movable rigid furnace section comprising rigid walls defining a heating chamber, a tubular muffle extending longitudinally within the heating chamber, means anchoring the muffle against movement at one point, said muffle being adapted to expand and contract longitudinally relative to the anchor point due to temperature changes within the heating chamber, sprocket and chain means operatively connected to the rigid furnace section for bodily moving it longitudinally in either direction, a reversing motor operatively connected to said sprocket and chain means, limit switches for controlling the operation of the motor in either direction, and means upon the muffle for operating said limit switches when the muffle expands and contracts so as to bodily move the rigid furnace section longitudinally with the muffle as the muffle expands and contracts.

7. In a muffle type furnace, a longitudinally bodily movable rigid furnace section comprising rigid walls defining a heating chamber, a tubular muffle extending longitudinally within the heating chamber, means anchoring the muffle against movement at one point, said muffle being adapted to expand and contract longitudinally relative ot the anchor point due to temperature changes within the heating chamber, cooperating lug and socket means upon the rigid furnace section and the muffle for bodily moving said rigid furnace section longitudinally with the muffle when the muffle expands and contracts.

8. In a muffle type furnace, a plurality of relatively longitudinally bodily movable rigid furnace sections, each furnace section comprising rigid walls defining a heating chamber, a tubular muffle extending longitudinally within the heating chambers, means anchoring the muffle against movement at one point, said muffle being adapted to expand and contract longitudinally relative to the anchor point due to temperature changes within said heating chambers, and means operated by expansion and contraction of the muffle for bodily moving at least one of said rigid furnace sections longitudinally with the muffle as the muffle expands and contracts.

9. In a muffle type furnace, a plurality of relatively longitudinally bodily movable rigid furnace sections, each furnace section comprising rigid walls defining a heating chamber, a tubular muffle extending longitudinally within the heating chamber, means anchoring the muffle against movement at one point, said muffle being adapted to expand and contract longitudinally relative to the anchor point due to temperature changes within said heating chambers, and means operated by expansion and contraction of the muffle for relatively bodily moving said rigid furnace sections longitudinally with the muffle as the muffle expands and contracts.

10. In a muffle type furnace, a stationary furnace section and a longitudinally bodily movable rigid furnace section, each of said furnace sections comprising rigid walls defining a heating chamber, a tubular muffle extending longitudinally within said heating chambers, means anchoring the muffle against movement at one point, said muffle being adapted to expand and contract longitudinally relative to the anchor point due to temperature changes within said heating chambers, and means operated by expansion and contraction of the muffle for bodily moving said movable rigid furnace section longitudinally with the muffle as the muffle expands and contracts.

11. In a muffle type furnace, a plurality of relatively longitdinally bodily movable rigid furnace sections, each furnace section comprising rigid walls defining a heating chamber, a sealing ring attached to the end portion of one of said furnace sections and slidably engaging the adjacent end portion of the adjacent furnace section, a tubular muffle extending longitudinally within the heating chambers, means anchoring the muffle against movement at one point, said muffle being adapted to expand and contract longitudinally relative to the anchor point due to temperature changes within said heating chambers, and means operated by expansion and contraction of the muffle for bodily moving at least one of said rigid furnace sections longitudinally with the muffle as the muffle expands and contracts.

12. In a muffle type furnace, a plurality of independently bodily movable rigid furnace sections each comprising rigid walls defining a heating chamber, a tubular muffle extending longitudinally within said furnace chamber, means anchoring the muffle against movement at one point, said muffle being adapted to expand and contract longitudinally relative to the anchor point due to temperature changes in said heating chambers, and means connecting each furnace section to the adjacent portion of the muffle, whereby when the muffle expands and contracts said rigid furnace sections will be independently relatively bodily moved longitudinally thereby.

13. In a muffle type furnace, a plurality of independently bodily movable rigid furnace sections each comprising rigid walls defining a heating chamber, a tubular muffle extending longitudinally within said furnace chambers, means anchoring the muffle against movement at one point, said muffle being adapted to expand and contract longitudinally relative to the anchor point due to temperature changes in said heating chambers, movable struts within the furnace chambers tiltably engaging opposite sides of the muffle near a horizontal plane located through the axis of the muffle, and means connecting each furnace section to the adjacent portion of the muffle, whereby when the muffle expands and contracts said rigid furnace sections will be independently relatively bodily moved longitudinally thereby.

14. In a muffle type furnace, a plurality of independently bodily movable rigid furnace sections each comprising rigid walls defining a heating chamber, a tubular muffle extending longitudinally within said furnace chambers, means anchoring the muffle against movement at one point, said muffle being adapted to expand and contract longitudinally relative to the anchor point due to the temperature changes in said heating rigid chambers, power operated means for independently bodily moving each furnace section longitudinally, and control means operated by expansion and contraction of the muffle for controlling the operation of said power operated means so as to bodily move the rigid furnace sections longitudinally with the muffle as the muffle expands and contracts.

15. In a muffle type furnace, a longitudinally bodily movable rigid furnace section comprising rigid walls defining a heating chamber, a tubular muffle extending longitudinally within the heating chamber, means anchoring the muffle against movement at one point, said muffle being adapted to expand and contract longitudinally relative to the anchor point due to temperature changes within the heating chamber, movable struts within the furnace chamber tiltably engaging opposite sides of the muffle near a horizontal plane located through the axis of the muffle, and means operated by expansion and contraction of the muffle for bodily moving said rigid furnace section longitudinally with the muffle as the muffle expands and contracts.

16. In a muffle type furnace, a stationary furnace section and a longitudinally bodily movable rigid furnace section, each of said furnace sections comprising rigid walls defining a heating chamber, a tubular muffle extending longitudinally within said heating chambers, means anchoring the muffle against movement at one point, said muffle being adapted to expand and contract longitudinally relative to the anchor point due to temperature changes within said heating chambers, movable struts within the furnace chamber tiltably engaging opposite sides of the muffle near a horizontal plane located through the axis of the muffle, and means operated by expansion and contraction of the muffle for bodily moving said movable rigid furnace section longitudinally with the muffle as the muffle expands and contracts.

17. In a muffle type furnace, a plurality of independently bodily movable rigid furnace sections each comprising rigid walls defining a heating chamber, a sealing ring attached to the end portions of certain of said furnace sections and slidably engaging the adjacent end portions of adjacent furnace sections, a tubular muffle extending longitudinally within said furnace chambers, means anchoring the muffle against movement at one point, said muffle being adapted to expand and contract longitudinally relative to the anchor point due to temperature changes in said heating chambers, and means connecting each furnace section to the adjacent portion of the muffle, whereby when the muffle expands and contracts said rigid furnace sections will be independently bodily moved longitudinally thereby.

18. In a muffle type furnace, a stationary furnace section and a longitudinally movable furnace section, the stationary furnace section being at the exit end of the furnace, each of said furnace sections comprising walls defining a heating chamber, a tubular muffle extending longitudinally within said heating chambers, said muffle being adapted to expand and contract longitudinally due to temperature changes within said heating chambers, means anchoring the muffle adjacent the exit end of the stationary furnace section, an entrance vestibule attached to the entrance end of the muffle, power operated means for moving the movable furnace section longitudinally, and control means operatively connected near the point of attachment of the entrance vestibule to the muffle for controlling the operation of said power operated means so as to move the movable furnace section longitudinally with the muffle as the muffle expands and contracts.

19. In a muffle type furnace, a plurality of relatively longitudinally bodily movable rigid furnace sections, each furnace section comprising rigid walls defining a heating chamber, a tubular muffle extending longitudinally within the heating chambers, means anchoring the muffle against movement at one point, said muffle being adapted to expand and contract longitudinally relative to the anchor point due to temperature changes within said heating chambers, transversely disposed horizontal tubular members connected to opposite sides of the muffle and extending through the walls of the furnace sections, bearing assemblies upon the outer ends of said tubular members, and rolls journalled in said bearing assemblies and extending through said tubular members and through the muffle, and means operated by expansion and contraction of the muffle for bodily moving at least one of said rigid furnace sections longitudinally with the muffle as the muffle expands and contracts.

20. In a muffle type furnace, a longitudinally movable furnace section comprising walls defining a heating chamber, a tubular muffle extending longitudinally within the heating chamber, means anchoring the muffle against movement at one point, said muffle being adapted to expand and contract longitudinally relative to the anchor point due to temperature changes within the heating chamber, and means operated by expansion and contraction of the muffle for moving said furnace section longitudinally a lesser amount than the movement of the muffle.

21. In a muffle type furnace, a plurality of relatively longitudinally movable furnace sections, each furnace section comprising walls defining a heating chamber, a tubular muffle extending longitudinally within the heating chambers, means anchoring the muffle against movement at one point, said muffle being adapted to expand and contract longitudinally relative to the anchor point due to temperature changes within said heating chambers, transversely disposed horizontal tubular members connected to opposite sides of the muffle and extending through the walls of the furnace sections, rolls located through said tubular members and through the muffle, power operated means for moving at least one of said furnace sections longitudinally and limit switches associated with said tubular members for controlling said power means so as to move at least one furnace section longitudinally with the muffle as the muffle expands and contracts.

22. In a muffle type furnace, a plurality of relatively longitudinally bodily movable rigid furnace sections, each furnace section comprising rigid walls defining a heating chamber, a tubular muffle extending longitudinally within the heating chambers, means anchoring the muffle against movement at one point, said muffle being adapted to expand and contract longitudinally relative to the anchor point due to temperature changes within said heating chambers, transversely disposed horizontal tubular members connected to opposite sides of the muffle and extending through the walls of the furnace sections, rolls located through said tubular members and through the muffle, means operated by expansion and contraction of the muffle for bodily moving at least one of said rigid furnace sections longitudinally with the muffle as the muffle expands and contracts, said transversely disposed horizontal tubular members acting to prevent substantial relative movement between the furnace sections and the tubular muffle at the roll location.

23. In a muffle type furnace, a rigid furnace section comprising rigid walls defining a heating chamber, cooperating rail and roller means mounting said rigid furnace section for longitudinal movement, a tubular muffle within the furnace and extending longitudinally within said heating chamber, means anchoring the muffle against movement at one point, said muffle being adapted to expand and contract longitudinally relative to the anchor point due to temperature changes within the heating chamber, and means operated by expansion and contraction of the muffle for bodily moving said rigid furnace section longitudinally upon said rail and roller means as the muffle expands and contracts.

24. In a muffle type furnace, a plurality of rigid furnace sections, each furnace section comprising rigid walls defining a heating chamber, cooperating rail and roller means mounting said rigid furnace sections for relative longitudinal movement, a tubular muffle extending longitudinally within the heating chambers, means anchoring the muffle against movement at one point, said muffle being adapted to expand and contract longitudinally relative to the anchor point due to temperature changes within the heating chambers, and means operated by expansion and contraction of the muffle for relatively bodily moving said rigid furnace sections longitudinally upon said rail and roller means as the muffle expands and contracts.

References Cited in the file of this patent

UNITED STATES PATENTS

| | | |
|---|---|---|
| 651,461 | Jenkins | June 12, 1900 |
| 1,590,161 | Hamburger et al. | June 22, 1926 |
| 2,576,169 | Ashton | Nov. 27, 1951 |
| 2,671,655 | Osterman | Mar. 9, 1954 |